United States Patent
Border et al.

(10) Patent No.: US 6,795,848 B1
(45) Date of Patent: Sep. 21, 2004

(54) SYSTEM AND METHOD OF READING AHEAD OF OBJECTS FOR DELIVERY TO AN HTTP PROXY SERVER

(75) Inventors: John Border, Germantown, MD (US); Douglas Dillon, Gaithersburg, MD (US); Matt Butehorn, Mt. Airy, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 765 days.

(21) Appl. No.: 09/708,134

(22) Filed: Nov. 8, 2000

(51) Int. Cl.[7] ............................................. G06F 15/167
(52) U.S. Cl. .................... 709/213; 709/203; 709/201
(58) Field of Search ............................... 709/201–203, 709/238, 225, 226, 229, 213; 711/117, 118, 122, 137

(56) References Cited

U.S. PATENT DOCUMENTS

| | | | | | |
|---|---|---|---|---|---|
| 5,995,725 | A | * | 11/1999 | Dillon | 709/203 |
| 6,112,228 | A | * | 8/2000 | Earl et al. | 709/205 |
| 6,226,635 | B1 | * | 5/2001 | Katariya | 707/4 |
| 6,282,542 | B1 | * | 8/2001 | Carneal et al. | 707/10 |
| 6,442,651 | B2 | * | 8/2002 | Crow et al. | 711/118 |
| 6,658,463 | B1 | | 12/2003 | Dillon et al. | 709/219 |

FOREIGN PATENT DOCUMENTS

| | | |
|---|---|---|
| DE | 198 21 876 A | 11/1999 |
| WO | WO 98/53410 | 11/1998 |
| WO | WO 99/08429 | 2/1999 |

OTHER PUBLICATIONS

Luotonen A: "Web Proxy Servers", Web Proxy Servers, XX, XX, 1998 pp. 156–170, XP002928629 p. 170, line 12–p. 170, line 40.

Ari Loutonen, Web Proxy Servers, XP002928629, pp. 156–170, Prentice Hall PTR, Upper Saddle River, NJ.

H. Inoue, et al., "An Adaptive WWW Cache Mechanism in the AI3 Network", *Proceedings of the INET'97*, www.iso-c.org/inet97/proceedings/A1/A1_2.HTM, pp. 1–5.

Y. Zhang, et al., "HBX High Bandwidth X for Satellite Internetworking", 10th Annual X Technical Conference, San Jose, CA, Feb. 12–14, 1996 (The X Resource, Issue 17, pp. 85–94), pp. 1–10.

T. Baba, et al., "AI[3] Satellite Internet Infrastructure and the Deployment in Asia", IEICE Trans. Commun., vol. E84–B, No. 8, Aug. 2001, pp. 2048–2057.

H. Inoue, "An Adaptive WWW Cache Mechanism in the AI3 Network", INET'97 (Jun. 24–27, 1997), www.ai3.net/pub/inet97/cache_ppt/foils.html, pp. 1–9.

* cited by examiner

*Primary Examiner*—Mehmet B. Geckil
(74) *Attorney, Agent, or Firm*—John T. Whelan

(57) ABSTRACT

A communication system for retrieving web content is disclosed. A downstream proxy server receives a URL request message from a web browser, in which the URL request message specifies a URL content that has an embedded object. An upstream proxy server receives the URL request message from the downstream proxy server. The upstream proxy server selectively forwards the URL request message to a web server and receives the URL content from the web server, wherein the upstream proxy server forwards the URL content to the downstream proxy server and parses the URL content to obtain the embedded object prior to receiving a corresponding embedded object request message initiated by the web browser.

4 Claims, 7 Drawing Sheets

SYSTEM AND METHOD OF READING AHEAD OF OBJECTS FOR DELIVERY TO AN HTTP PROXY SERVER

CROSS-REFERENCES TO RELATED APPLICATION

This application is related to co-pending U.S. patent application Ser. No. 09/498,936, filed Feb. 4, 2000, entitled "Satellite Multicast Performance Enhancing Multicast HTTP Proxy System and Method," the entirety of which is incorporated herein by reference.

BACKGROUND OF THE INVENTION

1. Field of the Invention

The present invention relates to a communication system, and is more particularly related to retrieving web content using proxy servers.

2. Discussion of the Background

As businesses and society, in general, become increasingly reliant on communication networks to conduct a variety of activities, ranging from business transactions to personal entertainment, these communication networks continue to experience greater and greater delay, stemming in part from traffic congestion and network latency. For example, the maturity of electronic commerce and acceptance of the Internet, in particular the World Wide Web ("Web"), as a daily tool pose an enormous challenge to communication engineers to develop techniques to reduce network latency and user response times. With the advances in processing power of desktop computers, the average user has grown accustomed to sophisticated applications (e.g., streaming video, radio broadcasts, video games, etc.), which place tremendous strain on network resources. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network).

FIG. 6 is a diagram of a conventional communication system for providing retrieval of web content by a personal computer (PC). PC 601 is loaded with a web browser 603 to access the web pages that are resident on web server 605; collectively the web pages and web server 605 denote a "web site." PC 603 connects to a wide area network (WAN) 607, which is linked to the Internet 609. The above arrangement is typical of a business environment, whereby the PC 601 is networked to the Internet 609. A residential user, in contrast, normally has a dial-up connection (not shown) to the Internet 609 for access to the Web. The phenomenal growth of the Web is attributable to the ease and standardized manner of "creating" a web page, which can possess textual, audio, and video content.

Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc.) or the individual piece of content addressed by the URL. When a distinction is required, the term "URL address" refers to the URL itself while the terms "web content", "URL content" or "URL object" refers to the content addressed by the URL.

In a typical transaction, the user enters or specifies a URL to the web browser 603, which in turn requests a URL from the web server 605. The web server 605 returns an HTML page, which contains numerous embedded objects (i.e., web content), to the web browser 603. Upon receiving the HTML page, the web browser 603 parses the page to retrieve each embedded object. The retrieval process often requires the establishment of separate communication sessions (e.g., TCP (Transmission Control Protocol) sessions) to the web server 605. That is, after an embedded object is received, the TCP session is torn down and another TCP session is established for the next object. Given the richness of the content of web pages, it is not uncommon for a web page to possess over 30 embedded objects. This arrangement disadvantageously consumes network resources, but more significantly, introduces delay to the user.

Delay is further increased if the WAN 607 is a satellite network, as the network latency of the satellite network is conventionally a longer latency than terrestrial networks. In addition, because HTTP utilizes a separate TCP connection for each transaction, the large number of transactions amplifies the network latency. Further, the manner in which frames are created and images are embedded in HTML requires a separate HTTP transaction for every frame and URL compounds the delay.

Based on the foregoing, there is a clear need for improved approaches for retrieval of web content within a communication system.

There is a need to utilize standard protocols to avoid development costs and provide rapid industry acceptance.

There is also a need for a web content retrieval mechanism that makes the networks with relatively large latency viable and/or competitive for Internet access.

Therefore, an approach for retrieving web content that reduces user response times is highly desirable.

SUMMARY OF THE INVENTION

According to one aspect of the invention, a communication system for retrieving web content comprises a downstream proxy server that is configured to receive a URL request message from a web browser. The URL request message specifies a URL content that has an embedded object. An upstream proxy server is configured to communicate with the downstream proxy server and to receive the URL request message from the downstream proxy server. The upstream proxy server selectively forwards the URL request message to a web server and receives the URL content from the web server, wherein the upstream proxy server forwards the URL content to the downstream proxy server and parses the URL content to obtain the embedded object prior to the web browser having to issue an embedded object request message. The above arrangement advantageously reduces user response time associated with web browsing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides a communication system for retrieving web content. A downstream proxy server receives a URL request message from a web browser, in which the URL request message specifies a URL content that has an embedded object. An upstream proxy server receives the URL request message from the downstream proxy server. The upstream proxy server selectively forwards the URL request message to a web server and receives the URL content from the web server. The upstream proxy server forwards the URL content to the downstream proxy server and parses the URL content to obtain the embedded object prior to receiving a corresponding embedded object request message initiated by the web browser.

Although the present invention is discussed with respect to a protocols and interfaces to support communication with the Internet, the present invention has applicability to any protocols and interfaces to support a packet switched network, in general.

Figure 1:
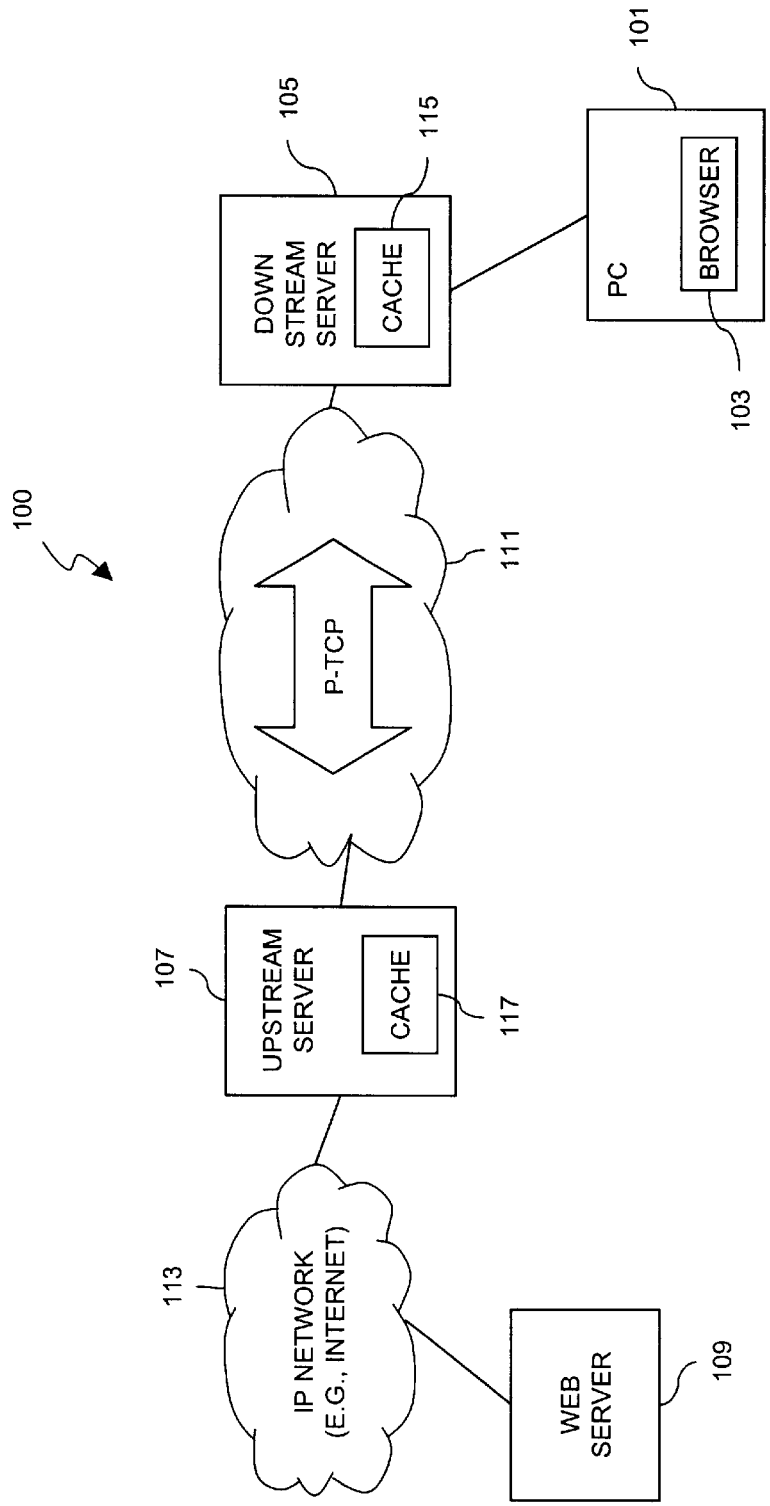
FIG. 1 is a diagram of a communication system employing a downstream proxy server and an upstream proxy server for accessing a web server, according to an embodiment of the present invention.

FIG. 1 shows a diagram of a communication system employing a downstream proxy server and an upstream proxy server for accessing a web server, according to an embodiment of the present invention. Communication system 100 includes a user station 101 that utilizes a standard web browser 103 (e.g., Microsoft Internet Explorer, Netscape Navigator). In this example, the user station 101 is a personal computer (PC); however, any computing platform may be utilized, such as a workstation, web enabled set-top boxes, web appliances, etc. System 100 utilizes two proxy servers 105 and 107, which are referred to as a downstream proxy server 105 and an upstream proxy server 107, respectively. PC 101 connects to downstream server 105, which communicates with upstream server 107 through a network 111. This communication with downstream server 105 may be transparent to PC 101. According to an embodiment of the present invention, the network 111 is a VSAT (Very Small Aperture Terminal) satellite network. Alternatively, the network 111 may be any type of Wide Area Network (WAN); e.g., ATM (Asynchronous Transfer Mode) network, router-based network, T1 network, etc. The upstream server 107 has connectivity to an IP network 113, such as the Internet, to access web server 109.

Proxy servers 105 and 107, according to an embodiment of the present invention, are Hypertext Transfer Protocol (HTTP) proxy servers with HTTP caches 115 and 117, respectively. These servers 105 and 107 communicate using persistent connections (which is a feature of HTTP 1.1). Use of persistent connections enables a single TCP connection to be reused for multiple requests of the embedded objects within a web page associated with web server 109. Further, TCP Transaction Multiplexing Protocol (TTMP) may be utilized. TTMP and persistent-TCP are more fully described with respect to FIG. 3.

Web browser 103 may be configured to either access URLs directly from a web server 109 or from HTTP proxy servers 105 and 107. A web page may refer to various source documents by indicating the associated URLs. As discussed above, a URL specifies an address of an "object" in the Internet 113 by explicitly indicating the method of accessing the resource. A representative format of a URL is as follows: http://www.hns.com/homepage/document.html. This example indicates that the file "document.html" is accessed using HTTP.

HTTP proxy server 105 and 107 acts as an intermediary between one or more browsers and many web servers (e.g., server 109). A web browser 103 requests a URL from the proxy server (e.g., 105) which in turn "gets" the URL from the addressed web server 109. An HTTP proxy 105 itself may be configured to either access URLs directly from a web server 109 or from another HTTP proxy server 107.

According to one embodiment of the present invention, the proxy servers 105 and 107 may support multicast delivery. IP multicasting can be used to transmit information from upstream server 107 to multiple downstream servers (of which only one downstream server 105 is shown). A multicast receiver (e.g., a network interface card (NIC)) for the downstream proxy server 105 operates in one of two modes: active and inactive. In the active mode operation, the downstream proxy server 105 opens multicast addresses and actively processes the received URLs on those addresses. During the inactive mode, the downstream proxy server 105 disables multicast reception from the upstream proxy server 107. In the inactive state the downstream proxy server 105 minimizes its use of resources by, for example, closing the cache and freeing its RAM memory (not shown).

For downstream proxy server 105 operating on a general purpose personal computer, the multicast receiver for the downstream proxy server 105 may be configured to switch between the active and inactive states to minimize the proxy server's interfering with user-directed processing. The downstream proxy server 105 utilizes an activity monitor which monitors user input (key clicks and mouse clicks) to determine when it should reduce resource utilization. The downstream proxy server 105 also monitors for proxy cache lookups to determine when it should go active.

Upon boot up, the multicast receiver is inactive. After a certain amount of time with no user interaction and no proxy cache lookups (e.g., 10 minutes), the downstream proxy server 105 sets the multicast receiver active. The downstream proxy server 105 sets the multicast receiver active immediately upon needing to perform a cache lookup. The downstream proxy server 105 sets the multicast receiver inactive whenever user activity is detected and the cache 115 has not had any lookups for a configurable period of time (e.g., 5 minutes).

For downstream proxy servers 105 running on systems with adequate CPU (central processing unit) resources to simultaneously handle URL reception and other applications, the user may configure the downstream proxy server 105 to set the multicast receiver to stay active regardless of user activity. The operation of system 100 in the retrieval of web content, according to an embodiment of the present invention, is described in FIG. 2, below.

Figure 2:
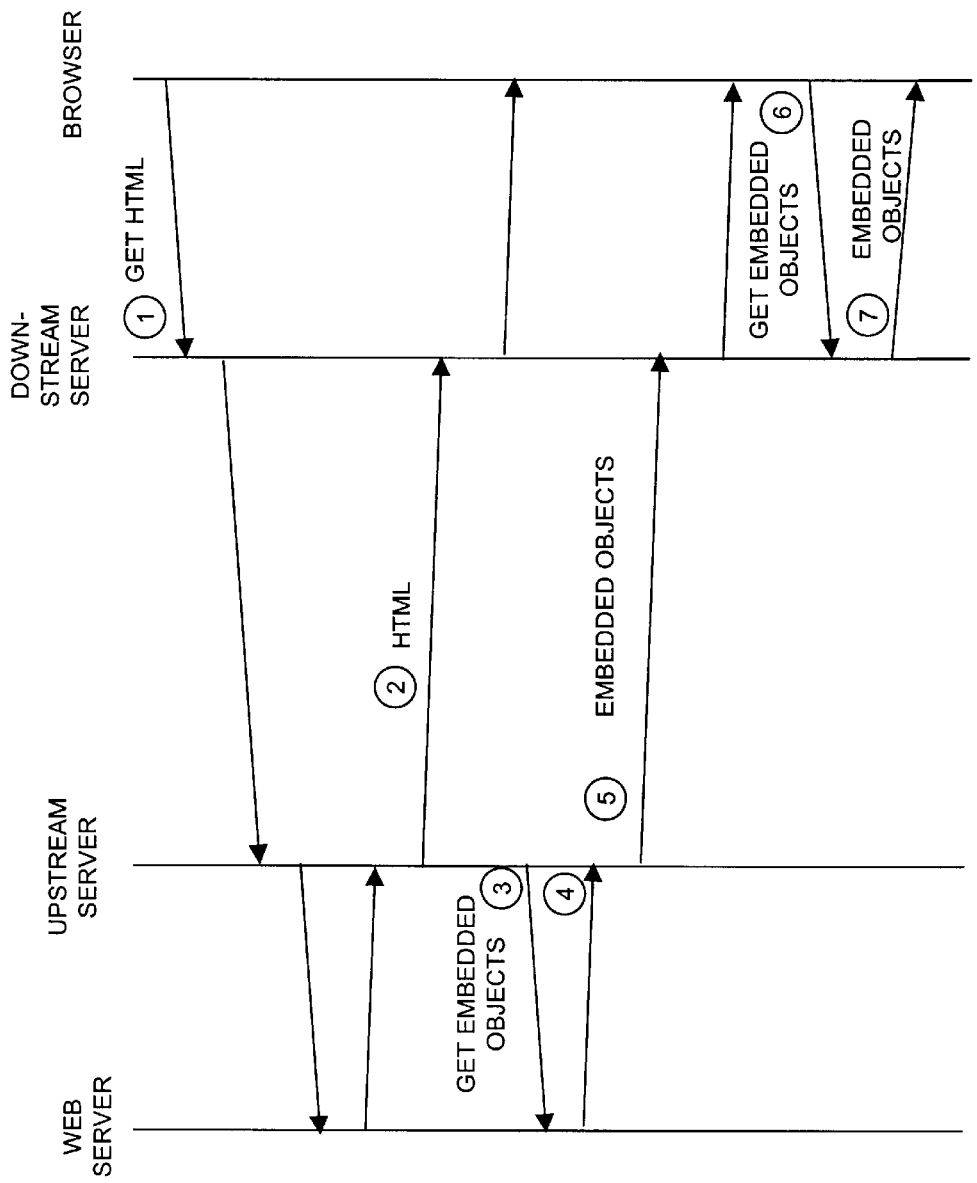
FIG. 2 is a sequence diagram of the process of reading ahead used in the system of FIG. 1.

FIG. 2 shows a sequence diagram of the process of reading ahead used in the system of FIG. 1. To retrieve a web page (i.e., HTML page) from web server 109, the web browser 103 on PC 101 issues an HTTP GET request, which is received by down stream proxy server 105 (per step 1). For the purposes of explanation, the HTML page is addressed as URL "HTML." The downstream server 105 checks its cache 115 to determine whether the requested URL has been previously visited. If the downstream proxy server 105 does not have URL HTML stored in cache 115, the server 105 relays this request, GET URL "HTML", to upstream server 117.

The HTTP protocol also supports a GET IF MODIFIED SINCE request wherein a web server (or a proxy server) either responds with a status code indicating that the URL has not changed or with the URL content if the URL has changed since the requested date and time. This mechanism updates cache 115 of proxy server 105 only if the contents have changed, thereby saving unnecessary processing costs.

The upstream server 117 in turn searches for the URL HTML in its cache 117; if the HTML page is not found in cache 117, the server 117 issues the GET URL HTML request the web server 109 for the HTML page. Next, in step 2, the web server 109 transmits the requested HTML page to the upstream server 117, which stores the received HTML page in cache 117. The upstream server 117 forwards the HTML page to the down stream server 105, and ultimately to the web browser 103. The HTML page is stored in cache 115 of the downstream server 105 as well as the web browser's cache (not shown). In step 3, the upstream server 117 parses the HTML page and requests the embedded objects within the HTML page from the web server 109; the embedded objects are requested prior to receiving corresponding embedded object requests initiated by the web browser 103.

Step 3 may involve the issuance of multiple GET requests; the web page within web server 109 may contain over 30 embedded objects, thus requiring 30 GET requests. In effect, this scheme provides a way to "read ahead" (i.e., retrieve the embedded object) in anticipation of corresponding requests by the web browser 103. The determination to read-ahead may be based upon explicit tracking of the content of the downstream server cache 115; only those embedded objects that are not found in the cache 115 are requested. Alternatively, the upstream server 107 may only request those embedded objects that are not in the upstream server cache 117. Further, in actual implementation wherein multiple web servers exist, the upstream server 107 may track which web server tend to transmit uncachable objects; for such servers, objects stored therein are read-ahead.

Moreover if the HTML contains a cookie and the GET HTML request is directed to the same web server, then the upstream server 107 includes the cookie in the read-ahead request to the web server 109 for the embedded objects. A cookie is information that a web server 109 stores on the client system, e.g., PC 101, to identify the client system. Cookies provide a way for the web server 109 to return customized web pages to the PC 101.

In step 4, the web server 109 honors the GET request by transmitting the embedded objects to the upstream server 107. The upstream server 107, as in step 5, then forwards the retrieved objects to the downstream server 105, where the objects are stored until they are requested by the web browser 103. It should be noted that the upstream server 107 forwards the embedded objects prior to being requested to do so by the web browser 103; however, the upstream server 107 performs this forwarding step based on an established criteria. There are scenarios in which all the embedded objects that are read-ahead may not subsequently be requested by the web browser 103. In such cases, if the upstream server 107 transfers these embedded objects over network 111 to the downstream server 105, the bandwidth of network 111 would be wasted, along with the resources of the downstream server 105. Accordingly, the forwarding criteria need to reflect the trade off between response time and bandwidth utilization. These forwarding criteria may include the following: (1) object size, and (2) "cachability." That is, upstream server 107 may only forward objects that are of a predetermined size or less, so that large objects (which occupy greater bandwidth) are not sent to the downstream server 105. Additionally, if the embedded object is marked uncacheable, then the object may be forwarded to the downstream server 105, which by definition will not have the object stored. The upstream server 107 may be configured to forward every retrieved embedded object, if bandwidth is not a major concern.

In the scenario in which the embedded objects correspond to a request that contains a cookie, the upstream server 107 provides an indication whether the embedded objects has the corresponding cookie.

In step 6, the web browser 103 issues a GET request for the embedded objects corresponding to the web page within the web server 109. The downstream server 105 recognizes that the requested embedded objects are stored within its cache 115 and forwards the embedded objects to the web browser 103. Under this approach, the delays associated with network 111 and the Internet 113 are advantageously avoided.

The caching HTTP proxy servers 105 and 107, according to one embodiment of the present invention, stores the most frequently accessed URLs. When web server 109 delivers a URL to the proxy servers 105 and 107, the web server 109 may deliver along with the URL an indication of whether the URL should not be cached and an indication of when the URL was last modified.

At this point, web browser 103 has already requested URL HTML, and has the URL HTML stored in a cache (not shown) of the PC 101. To avoid stale information, the web browser 103 needs to determine whether the information stored at URL HTML has been updated since the time it was last requested. As a result, the browser 103 issues a GET HTML IF MODIFIED SINCE the last time HTML was obtained. Assuming that URL HTML was obtained at 11:30 a.m. on Sep. 22, 2000, browser 103 issues a GET HTML IF MODIFIED SINCE Sep. 22, 2000 at 11:30 a.m. request. This request is sent to downstream proxy server 105. If downstream proxy server 105 has received an updated version of URL HTML since Sep. 22, 2000 at 11:30 a.m., downstream proxy server 105 supplies the new URL HTML information to the browser 103. If not, the downstream proxy server 105 issues a GET IF MODIFIED SINCE command to upstream proxy server 107. If upstream proxy server 107 has received an updated URL HTML since Sep. 22, 2000 at 11:30 a.m., upstream proxy server 107 passes the new URL HTML to the downstream proxy server 105. If not, the upstream proxy server 107 issues a GET HTML IF MODIFIED SINCE command to the web server 109. If URL HTML has not changed since Sep. 22, 2000 at 11:30 a.m., web server 109 issues a NO CHANGE response to the upstream proxy server 107. Under this arrangement, bandwidth and processing time are saved, since if the URL HTML has not been modified since the last request, the entire contents of URL HTML need not be transferred between web browser 103, downstream proxy server 105, upstream proxy server 107, and the web server 109, only an indication that there has been no change need be exchanged. Caching proxy servers 105 and 107 offer both reduced network utilization and reduced response time when they are able to satisfy requests with cached URLs.

Figure 3:
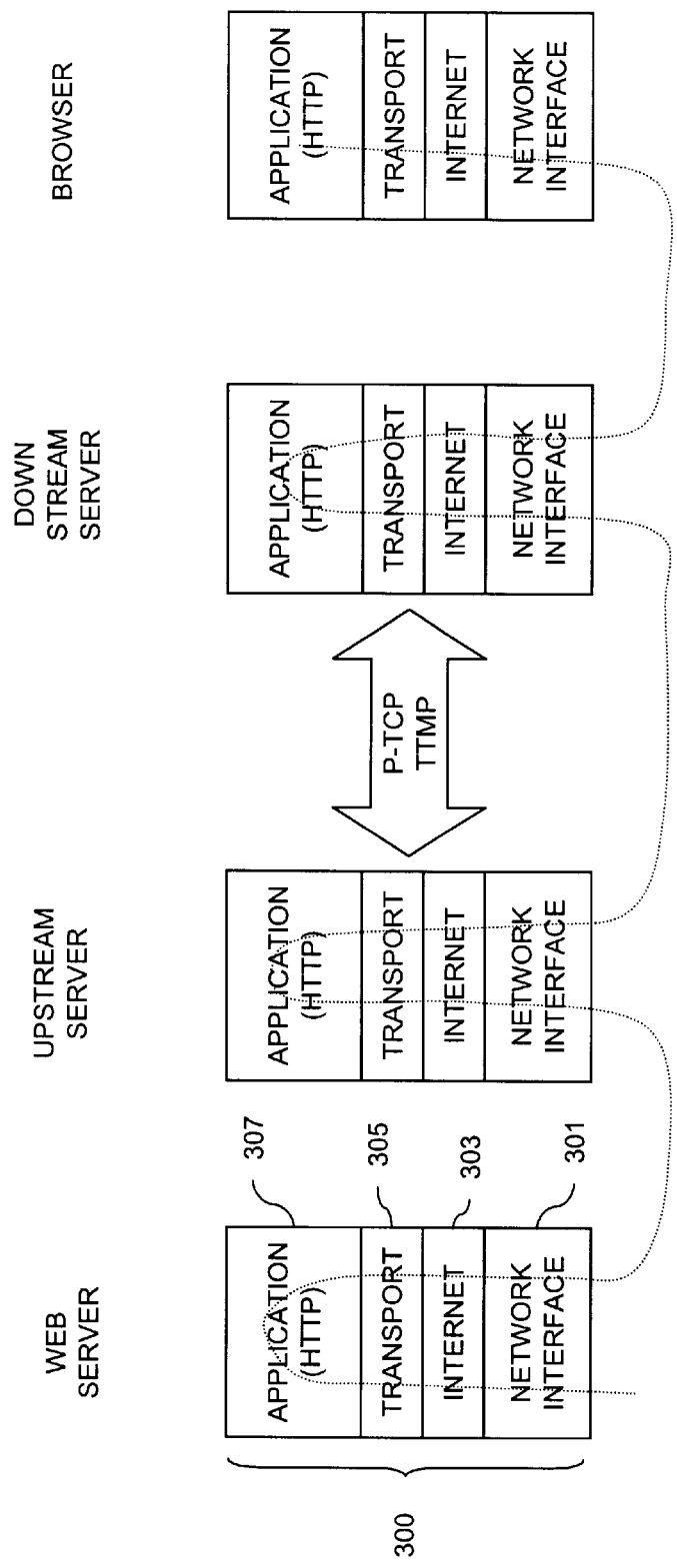
FIG. 3 is a block diagram of the protocols utilized in the system of FIG. 1.

FIG. 3 shows a block diagram of the protocols utilized in the system of FIG. 1. The servers 105, 107, and 109 and PC 101 employ, according to one embodiment of the present invention, a layered protocol stack 300. The protocol stack 300 includes a network interface layer 301, an Internet layer 303, a transport layer 305, and an application layer 307.

HTTP is an application level protocol that is employed for information transfer over the Web. RFC (Request for Comment) 2616 specifies this protocol and is incorporated herein in its entirety. In addition, a more detailed definition of URL can be found in RFC 1737, which is incorporated herein in its entirety.

The Internet layer 303 may be the Internet Protocol (IP) version 4 or 6, for instance. The transport layer 305 may include the TCP (Transmission Control Protocol) and the UDP (User Datagram Protocol). According to one embodiment of the present invention, at the transport layer, persistent TCP connections are utilized in the system 100; in addition, TCP Transaction Multiplexing Protocol (TTMP) may be used.

The TCP Transaction Multiplexing Protocol (TTMP) allows multiple transactions, in this case HTTP transactions, to be multiplexed onto one TCP connection. Thus, transaction multiplexing provides an improvement over separate connection for each transaction (HTTP 1.0) and pipelining (HTTP 1.1) by preventing a single stalled request from stalling other requests. This is particularly beneficial when the downstream proxy server 105 is supporting simultaneous requests from multiple browsers (of which only browser 103 is shown in FIG. 1).

The downstream proxy server 105 initiates and maintains a TCP connection to the upstream proxy server 107 as needed to carry HTTP transactions. The TCP connection could be set up and kept connected as long as the downstream proxy server 105 is running and connected to the network 111. The persistent TCP connection may also be set up when the first transaction is required and torn down after the connection has been idle for some period.

An HTTP transaction begins with a request header, optionally followed by request content which is sent from the downstream proxy server 105 to the upstream proxy server 107. An HTTP transaction concludes with a response header, optionally followed by response content. The downstream proxy server 105 maintains a transaction ID sequence number, which is incremented with each transaction. The downstream proxy server 105 breaks the transaction request into one or more blocks, creates a TTMP header for each block, and sends the blocks with a TTMP header to the upstream proxy server 107. The upstream proxy server 107 similarly breaks a transaction response into blocks and sends the blocks with a TTMP header to the downstream proxy server 105. The TTMP header contains the information necessary for the upstream proxy server 107 to reassemble a complete transaction command and to return the matching transaction response.

In particular, the TTMP header contains the following fields: a transaction ID field, a Block Length field, a Last Indication field, an Abort Indication field, and a Compression Information field. The transaction ID (i.e., the transaction sequence number) must rollover less frequently than the maximum number of supported outstanding transactions. The Block Length field allows a proxy server 105 and 107 to determine the beginning and ending of each block. The Last Indication field allows the proxy server 105 and 107 to determine when the end of a transaction response has been received. The Abort Indication field allows the proxy server 105 and 107 to abort a transaction when the transaction request or response cannot be completed. Lastly, the Compression Information field defines how to decompress the block.

The use of a single HTTP connection reduces the number of TCP acknowledgements that are sent over the network 111. Reduction in the number of TCP acknowledgements significantly reduces the use of inbound networking resources which is particularly important when the network 111 is a VSAT system or other wireless systems. This reduction of acknowledgements is more significant when techniques, such as those described in U.S. Pat. No. 5,995, 725 to Dillon entitled "Method and Apparatus for Requesting and Retrieving Information for a Source Computer Using Terrestrial and Satellite Interface" issued Nov. 30, 1999 (which is incorporated herein in its entirety), minimize the number of TCP acknowledgements per second per TCP connection.

Alternatively, downstream proxy server 105, for efficiency, may use the User Datagram Protocol (UDP) to transmit HTTP GET and GET IF MODIFIED SINCE requests to the upstream proxy server 107. This is done by placing the HTTP request header into the UDP payload. The use of UDP is very efficient as the overhead of establishing, maintaining and clearing TCP connections is not incurred. It is "best effort" in that there is no guarantee that the UDP packets will be delivered.

Figure 4:
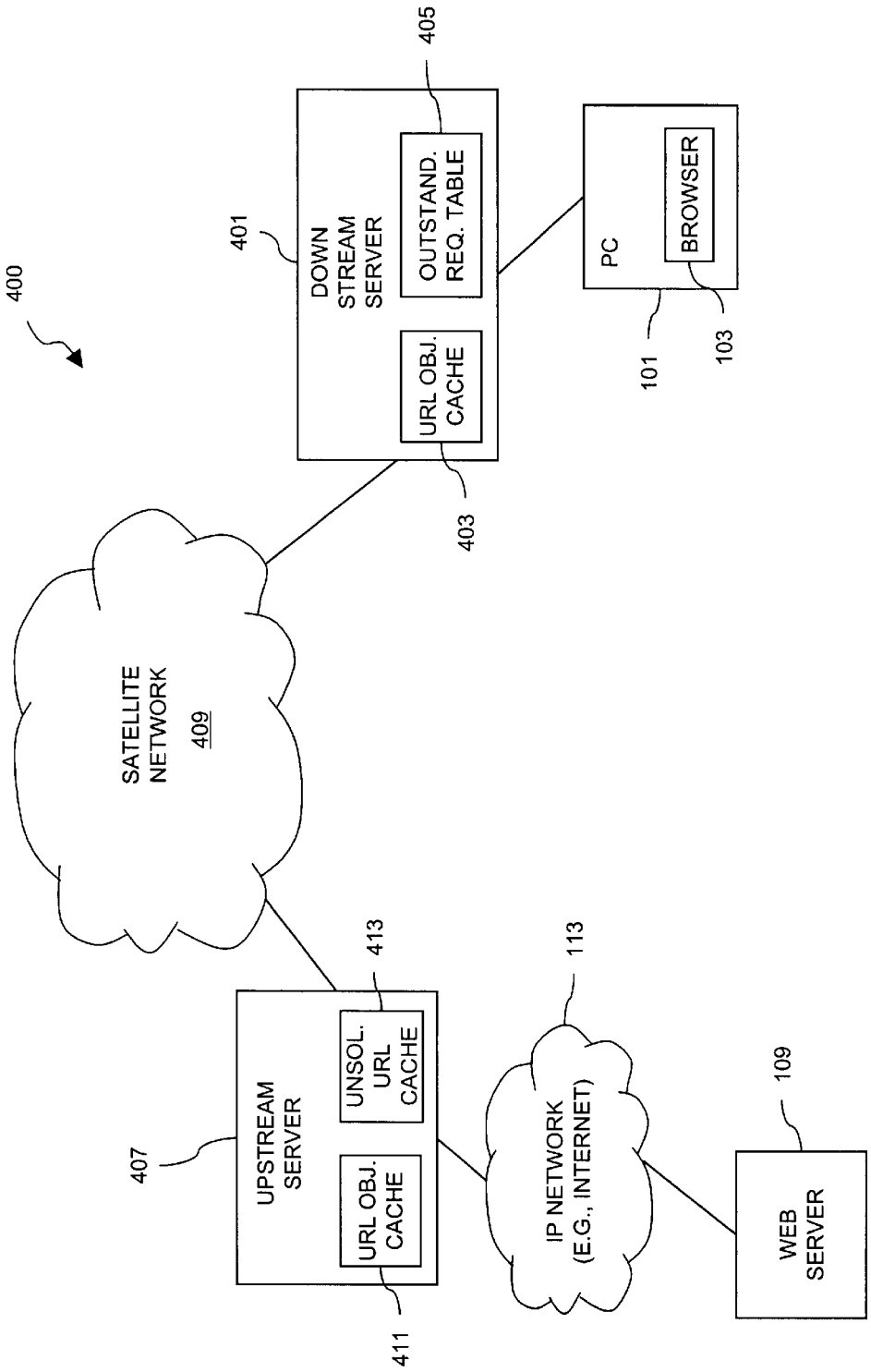
FIG. 4 is a diagram of a communication system employing a downstream proxy server and an upstream proxy server that maintains an unsolicited URL (Uniform Resource Locator) cache for accessing a web server, according to an embodiment of the present invention.

FIG. 4 shows a diagram of a communication system employing a downstream proxy server and an upstream proxy server that maintains an unsolicited URL (Uniform Resource Locator) cache for accessing a web server, according to an embodiment of the present invention. Communication system 400 employs a downstream server 401 that utilizes a cache 403 to store URL objects (i.e., embedded objects) as well as an Outstanding Request table 405. The table 405 tracks the URL requests that the downstream server 401 has forwarded to upstream server 407. In an embodiment of the present invention, the downstream server 401 and the upstream server 407 communicate over a satellite network 409. The upstream server 407 maintains a URL object cache 411 for storing the embedded objects that are retrieved from web server 109. In addition, the upstream server 407 uses an unsolicited URL cache 413, which stores the URL requests for embedded objects in advance of the web browser 103 initiating such requests. The above arrangement advantageously enhances system performance.

Figure 5:
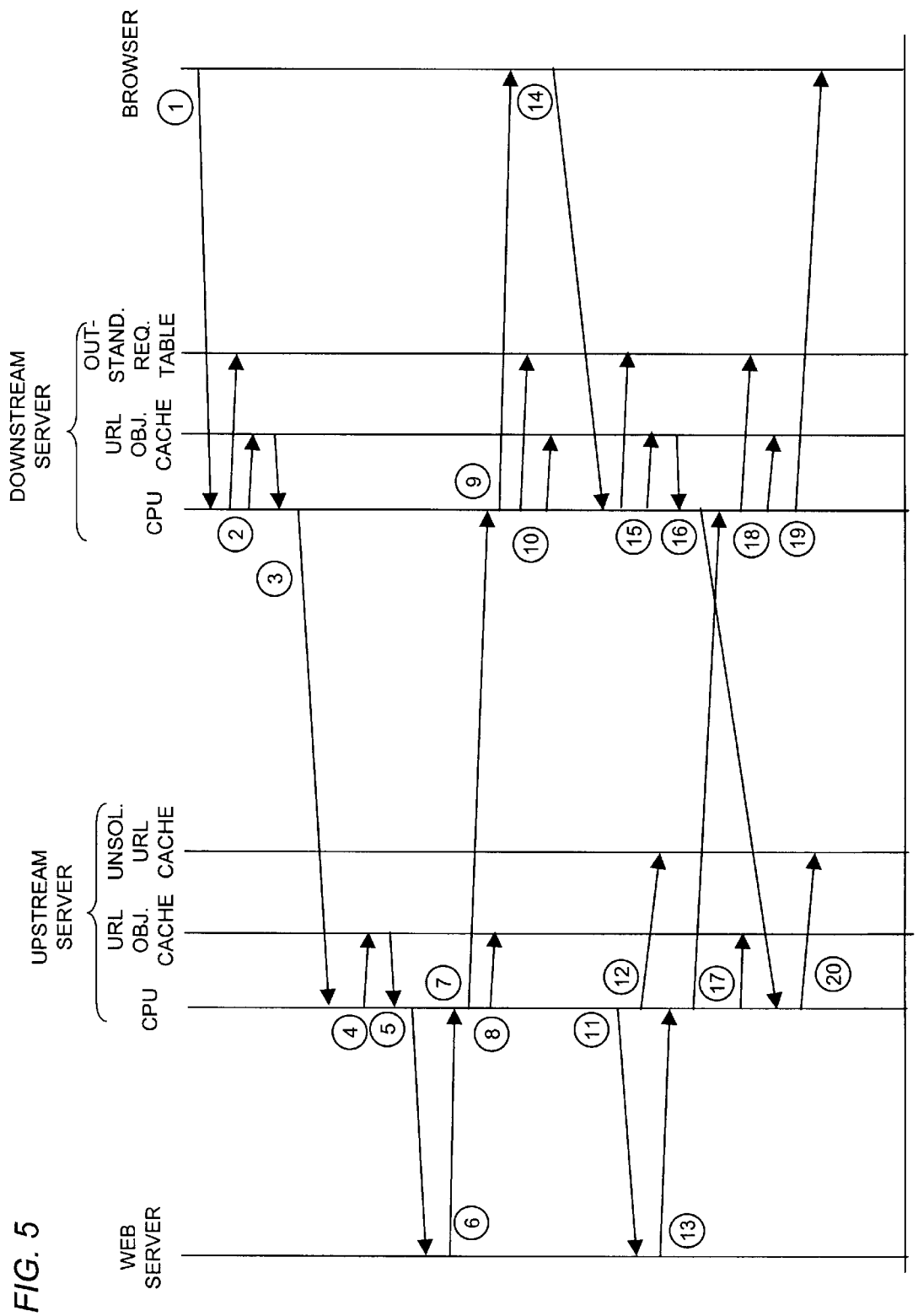
FIG. 5 is a sequence diagram of the process of reading ahead used in the system of FIG. 4.
Figure 6:
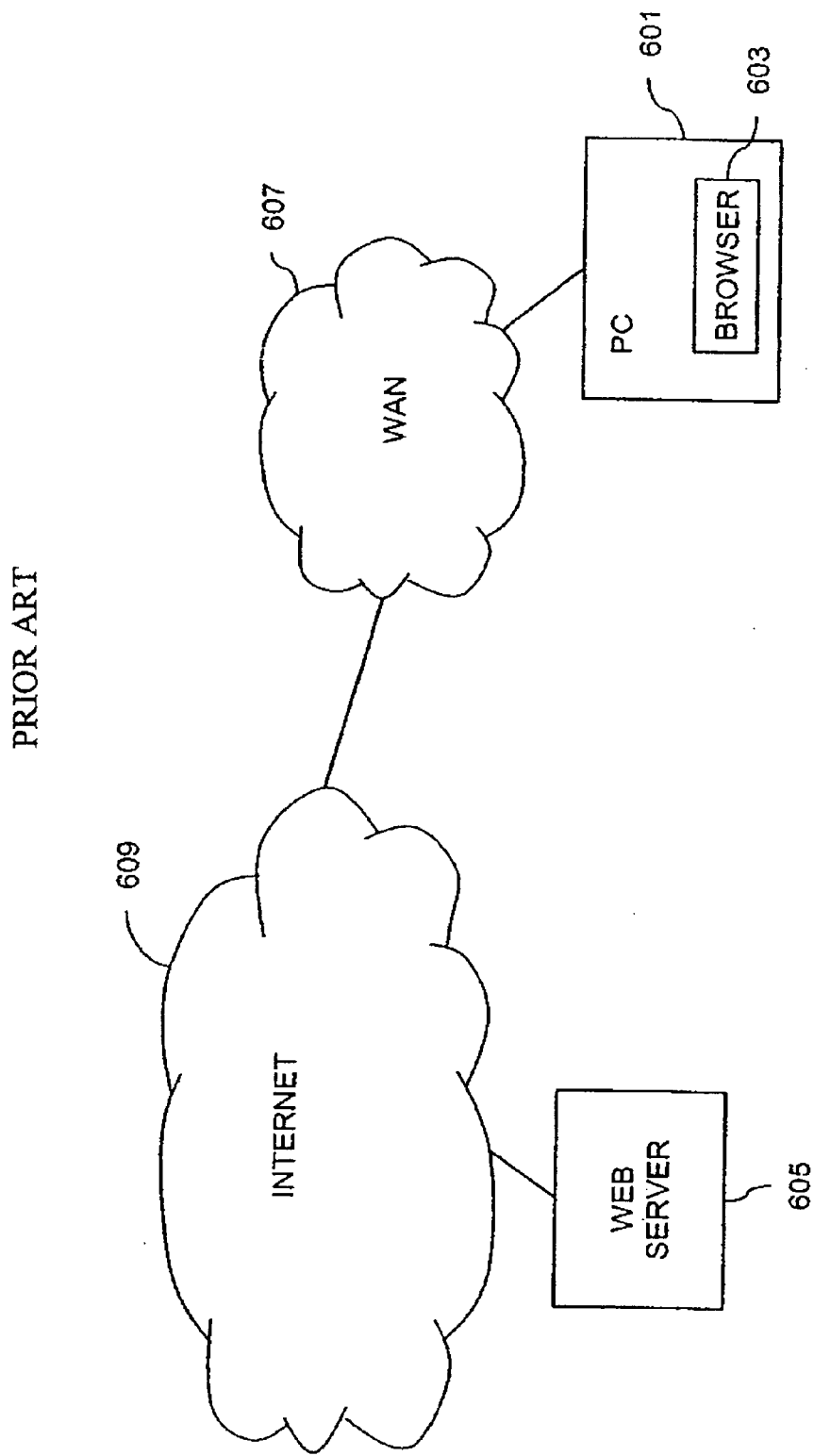
FIG. 6 is a diagram of a conventional communication system for providing retrieval of web content by a personal computer (PC)

FIG. 5 is a sequence diagram of the process of reading ahead used in the system of FIG. 4. In step 1, the web browser 101 sends a GET request (e.g., GET x.html) to the downstream server 401. The downstream server 401 checks the URL object cache 403 to determine whether x.html is stored in the URL object cache 403; if the content is stored in cache 403, the downstream server 401 forwards the content to the browser 103. Otherwise, the downstream server 401 writes the request in the Outstanding Request table 405 and sends the GET request to the upstream server 407 (step 3). In this case, the web browser 103 and the downstream server 401 have not encountered the requested html page before. However, in the event that the web browser 103 has requested this HTML in the past or the downstream server 401 has stored this HTML previously, the latest time stamp is passed to the upstream server as a conditional GET request (e.g., GET IF MODIFIED SINCE Sep. 22, 2000). In this manner, only content that is more updated than the time stamp are retrieved. In step 4, the upstream server 407 checks the URL object cache 411 in response to the received GET x.html request. Assuming x.html is not found in the URL object cache 411, the upstream server 407 forwards the GET x.html request to the web server 109, per step 5. Accordingly, the web server 109, as in step 6, returns the web page to the upstream server 407. In turn, the upstream server 407 forwards the web page to the downstream server 401, as in step 7, and stores the web page in the URL object cache 411, per step 8. In step 9, the downstream server 401 sends the received web page to the web browser 103. At this time, the downstream server 401 deletes the corresponding entry in the Outstanding Request table 405 and stores the received web page in the URL object cache 411 (step 10).

Concurrent with steps 9 and 10, the upstream server 407 parses the web page. The upstream server 407 then makes a determination, as in step 11, to read-ahead the embedded objects of the web page based upon the read-ahead criteria that were discussed with respect to FIG. 2, using a series of GET embedded object requests. Consequently, the upstream server 407 stores the URL x.html in the unsolicited URL cache 413, per step 12. In step 13, the web server 109 returns the embedded objects to the upstream server 407.

In step 14, the web browser 103 parses the x.html page and issues a series of GET embedded objects requests. However, for explanatory purposes, FIG. 5 shows a single transaction for step 14. In step 15, the downstream server 401 checks its URL object cache 403 for the requested embedded object, and, assuming the particular object is not stored in cache 403, writes an entry in the Outstanding Request table 405 corresponding to the GET embedded object request. Next, the downstream server 401 forwards the GET embedded object request to the upstream server 407 (per step 16).

As shown in FIG. 5, prior to the upstream server 407 receiving the GET embedded object request from the downstream server 401, the upstream server 407 forwards the embedded objects to the downstream server 401 based on a forwarding criteria (as previously discussed with respect to FIG. 2), storing these embedded objects in the URL object cache 413. In step 18, the downstream server 401 updates the Outstanding Request table 405 by deleting the GET embedded object request from the web browser 103, and stores the received embedded object that has been read-ahead from the upstream server 407. The embedded object is then transferred to the web browser 103 (per step 19). In step 20, upon receiving the GET embedded object from the downstream server 401, the upstream server 407 discards the corresponding URL in the Unsolicited URL cache 413. Under the above approach, the effects of network latencies associated with satellite network 409 and the Internet 113 are minimized, in that the web browser 103 receives the requested embedded object without having to wait for the full processing and transmission time associated with its GET embedded object request.

Figure 7:
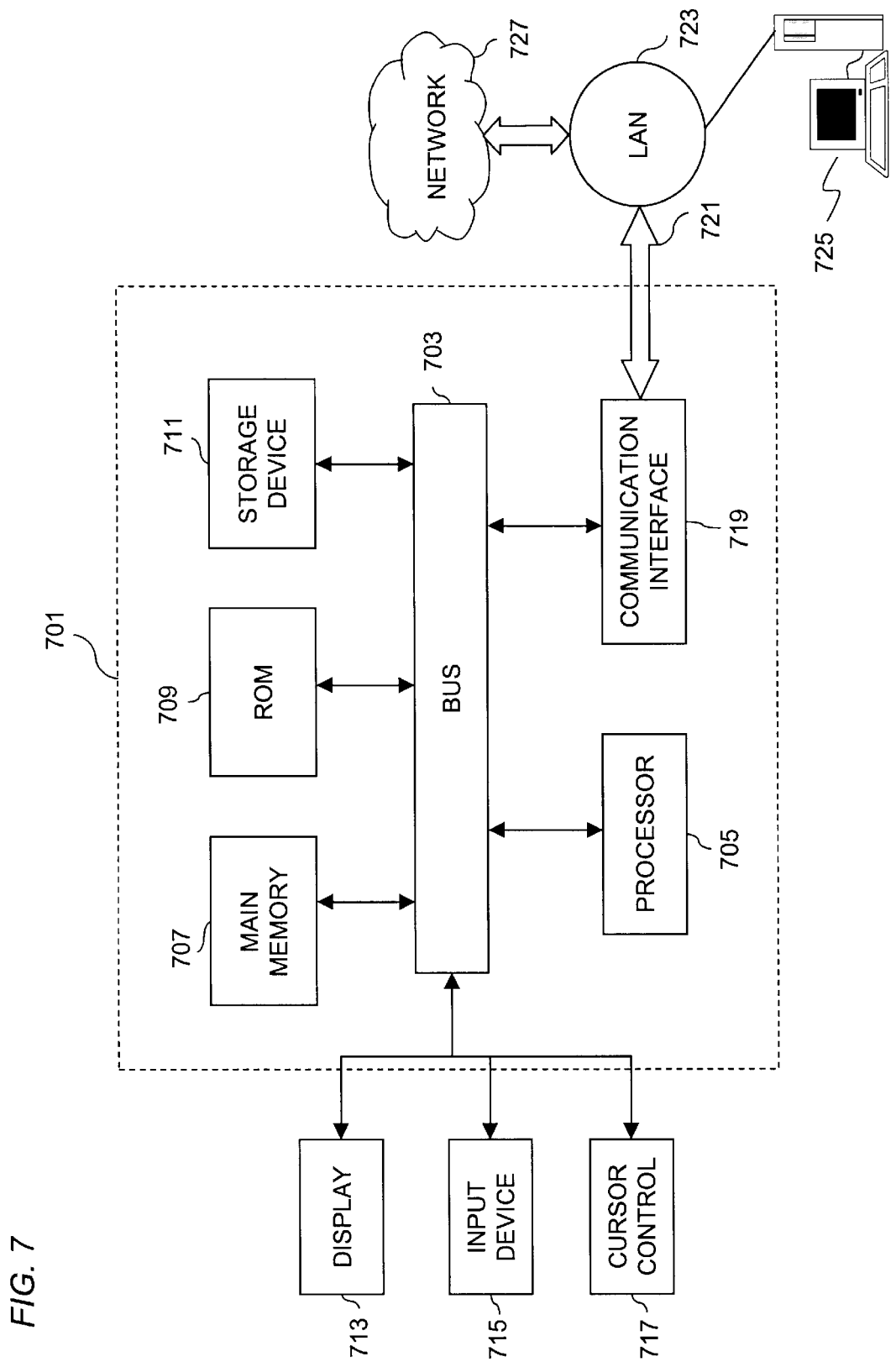
FIG. 7 is a diagram of a computer system that can be configured as a proxy server, in accordance with an embodiment of the present invention.

FIG. 7 is a diagram of a computer system that can be configured as a proxy server, in accordance with an embodiment of the present invention. Computer system 701 includes a bus 703 or other communication mechanism for communicating information, and a processor 705 coupled with bus 703 for processing the information. Computer system 701 also includes a main memory 707, such as a random access memory (RAM) or other dynamic storage device, coupled to bus 703 for storing information and instructions to be executed by processor 705. In addition, main memory 707 may be used for storing temporary variables or other intermediate information during execution of instructions to be executed by processor 705. Computer system 701 further includes a read only memory (ROM) 709 or other static storage device coupled to bus 703 for storing static information and instructions for processor 705. A storage device 711, such as a magnetic disk or optical disk, is provided and coupled to bus 703 for storing information and instructions.

Computer system 701 may be coupled via bus 703 to a display 713, such as a cathode ray tube (CRT), for displaying information to a computer user. An input device 715, including alphanumeric and other keys, is coupled to bus 703 for communicating information and command selections to processor 705. Another type of user input device is cursor control 717, such as a mouse, a trackball, or cursor direction keys for communicating direction information and command selections to processor 705 and for controlling cursor movement on display 713.

According to one embodiment, interaction within system 100 is provided by computer system 701 in response to processor 705 executing one or more sequences of one or more instructions contained in main memory 707. Such instructions may be read into main memory 707 from another computer-readable medium, such as storage device 711. Execution of the sequences of instructions contained in main memory 707 causes processor 705 to perform the process steps described herein. One or more processors in a multi-processing arrangement may also be employed to execute the sequences of instructions contained in main memory 707. In alternative embodiments, hard-wired circuitry may be used in place of or in combination with software instructions. Thus, embodiments are not limited to any specific combination of hardware circuitry and software.

Further, the instructions to support the system interfaces and protocols of system 100 may reside on a computer-readable medium. The term "computer-readable medium" as used herein refers to any medium that participates in providing instructions to processor 705 for execution. Such a medium may take many forms, including but not limited to, non-volatile media, volatile media, and transmission media. Non-volatile media includes, for example, optical or magnetic disks, such as storage device 711. Volatile media includes dynamic memory, such as main memory 707. Transmission media includes coaxial cables, copper wire and fiber optics, including the wires that comprise bus 703. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk of a remote computer. The remote computer can load the instructions relating to the issuance of read-ahead requests remotely into its dynamic memory and send the instructions over a telephone line using a modem. A modem local to computer system 701 can receive the data on the telephone line and use an infrared transmitter to convert the data to an infrared signal. An infrared detector coupled to bus 703 can receive the data carried in the infrared signal and place the data on bus 703. Bus 703 carries the data to main memory 707, from which processor 705 retrieves and executes the instructions. The instructions received by main memory 707 may optionally be stored on storage device 711 either before or after execution by processor 705.

Computer system 701 also includes a communication interface 719 coupled to bus 703. Communication interface 719 provides a two-way data communication coupling to a network link 721 that is connected to a local network 723. For example, communication interface 719 may be a network interface card to attach to any packet switched local area network (LAN). As another example, communication interface 719 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 719 sends and receives electrical, electromagnetic or optical signals that carry digital data streams representing various types of information.

Network link 721 typically provides data communication through one or more networks to other data devices. For example, network link 721 may provide a connection through local network 723 to a host computer 725 or to data equipment operated by a service provider, which provides data communication services through a communication network 727 (e.g., the Internet). LAN 723 and network 727 both use electrical, electromagnetic or optical signals that carry digital data streams. The signals through the various networks and the signals on network link 721 and through communication interface 719, which carry the digital data to and from computer system 701, are exemplary forms of carrier waves transporting the information. Computer system 701 can transmit notifications and receive data, including program code, through the network(s), network link 721 and communication interface 719.

The techniques described herein provide several advantages over prior approaches to retrieving web pages. A downstream proxy server is configured to receive a URL request message from a web browser, wherein the URL request message specifies a URL content that has an embedded object. An upstream proxy server is configured to communicate with the downstream proxy server and to receive the URL request message from the downstream proxy server. The upstream proxy server selectively forwards the URL request message to a web server and receives the URL content from the web server, wherein the upstream proxy server forwards the URL content to the downstream proxy server and parses the URL content to obtain the embedded object prior to receiving a corresponding embedded object request message initiated by the web browser. This approach advantageously improves user response time.

Obviously, numerous modifications and variations of the present invention are possible in light of the above teachings. It is therefore to be understood that within the scope of the appended claims, the invention may be practiced otherwise than as specifically described herein.

What is claimed is:

1. A communication system for retrieving web content, comprising:

a downstream proxy server configured to receive a URL request message from a web browser, the URL request message specifying a URL content having an embedded object; and an upstream proxy server configured to communicate with the downstream proxy server and to receive the URL request message from the downstream proxy server, the upstream proxy server selectively forwarding the URL request message to a web server and receiving the URL content from the web server, wherein the upstream proxy server forwards the URL content to the downstream proxy server and parses the URL content to obtain the embedded object prior to receiving a corresponding embedded object request message initiated by the web browser, wherein the upstream proxy server decides whether or not to send the embedded obiect to the downstream proxy server in accordance with the size of the embedded object.

2. A communication system for retrieving web content, comprising:

a downstream proxy server configured to receive a URL request message from a web browser, the URL request message specifying a URL content having an embedded object; and an upstream proxy server configured to communicate with the downstream proxy server and to receive the URL request message from the downstream proxy server, the upstream proxy server selectively forwarding the URL request message to a web server and receiving the URL content from the web server, wherein the upstream proxy server forwards the URL content to the downstream proxy server and parses the URL content to obtain the embedded object prior to receiving a corresponding embedded object request message initiated by the web browser, wherein the upstream proxy server decides whether or not to send the embedded object to the downstream proxy server in accordance with cachability of the embedded object.

3. A communication system for retrieving web content, comprising:

a downstream proxy server configured to receive a URL request message from a web browser, the URL request message specifying a URL content having an embedded object; and an upstream proxy server configured to communicate with the downstream proxy server and to receive the URL request message from the downstream proxy server, the upstream proxy server selectively forwarding the URL request message to a web server and receiving the URL content from the web server, wherein the upstream proxy server forwards the URL content to the downstream proxy server and parses the URL content to obtain the embedded object prior to receiving a corresponding embedded object request message initiated by the web browser, wherein in the case that the URL content has a cookie, the upstream proxy server uses the cookie when obtaining the embedded object.

4. A communication system for retrieving web content, comprising:

a downstream proxy server configured to receive a URL request message from a web browser, the URL request message specifying a URL content having an embedded object; and an upstream proxy server configured to communicate with the downstream proxy server and to receive the URL request message from the downstream proxy server, the upstream proxy server selectively forwarding the URL request message to a web server and receiving the URL content from the web server, wherein the upstream proxy server forwards the URL content to the downstream proxy server and parses the URL content to obtain the embedded object prior to receiving a corresponding embedded object request message initiated by the web browser, wherein the upstream proxy server comprises means for using a cookie when obtaining the embedded object.

* * * * *